United States Patent [19]

Kobussen et al.

[11] Patent Number: 5,759,602
[45] Date of Patent: Jun. 2, 1998

[54] METHOD FOR MAKING EXTRUDED FOOD PRODUCTS

[75] Inventors: Petrus Johannes Kobussen, Veghel, Netherlands; Josinus Johannes Jacobus Petrus Kobussen, Bobbit, N.C.; Martinus Wilhelmus Hendricus Kobussen, Veghel; Hendricus Franciscus Gerardus Smulders, Eindhoven, both of Netherlands

[73] Assignee: Townsend Engineering Company, Des Moines, Iowa

[21] Appl. No.: 722,163

[22] PCT Filed: Oct. 11, 1994

[86] PCT No.: PCT/US94/11474

§ 371 Date: Oct. 15, 1996

§ 102(e) Date: Oct. 15, 1996

[87] PCT Pub. No.: WO95/28090

PCT Pub. Date: Oct. 26, 1995

[30] Foreign Application Priority Data

Apr. 15, 1994 [NL] Netherlands ............... 9400602

[51] Int. Cl.$^6$ .................... A23B 4/00; A23P 1/00
[52] U.S. Cl. .................. 426/241; 426/305; 426/513; 426/516
[58] Field of Search ................. 426/237, 241, 426/231, 516, 305, 284, 513

[56] References Cited

U.S. PATENT DOCUMENTS

| 3,122,788 | 3/1964 | Lieberman | 425/206 |
| 3,408,918 | 11/1968 | Talty | 426/641 |
| 4,294,858 | 10/1981 | Moule | 426/241 |
| 5,413,800 | 5/1995 | Bell et al. | 426/305 |
| 5,580,595 | 12/1996 | Bows et al. | 426/305 |

FOREIGN PATENT DOCUMENTS

| 0 520 257 | 12/1992 | European Pat. Off. |
| 10 17 898 | 10/1957 | Germany . |
| 15 70 178 | 3/1970 | Germany . |
| 859 804 | 1/1961 | United Kingdom . |
| 1 119 284 | 11/1968 | United Kingdom . |
| WO 93-12660 | 7/1993 | WIPO . |

*Primary Examiner*—George Yeung
*Attorney, Agent, or Firm*—Zarley, McKee, Thomte, Voorhees & Sease

[57] ABSTRACT

A method and apparatus of continuously processing an elongated strand (1) of plastic edible material coated with a coagulated coating. A co-extruder (6) has interchangeable parts (9B) to provide strands of varying diameter. The strand is conveyed through a closed tubular conveyor (106) through which a brine fluid is simultaneously passed. The drying of the strand includes an infrared drier (3). A linker and/or crimper (2) is provided.

6 Claims, 8 Drawing Sheets

METHOD FOR MAKING EXTRUDED FOOD PRODUCTS

BACKGROUND OF THE INVENTION

This invention relates to a continuous food processing system whereby an edible plastic food strand of meat or the like is co-extruded with a coated material to be processed into a casing. This coating material may consist of a mixture or gel with a coagulatable protein, and reinforcing means. More specifically this invention relates to a method for the manufacturing whereby the method includes the steps of co-extruding a principally equal layer of gel around an extruded edible product and the treatment of the extruded gel coating with chemical and physical means for coagulation.

Such a method is generally known. These known methods are mainly being used for the co-extrusion of sausage or sausage-like materials. In principal this method involves the extrusion of a cylindrical nucleus of a sausage mix and simultaneously the extrusion around the sausage mix of an outside coating which consists of a gel with a collagen protein. The proteins in the gel are coagulated with the aid of a coagulation means.

The term "coagulation" is a term of art in the production of collagen coated sausage material and is not strictly scientific in the sense in which it is used. Coagulation as it is used in this specification refers to the step involving hardening and stabilization of the casing. This is principally achieved in two ways; firstly by removal of water from the collagen gel, and secondly by cross-linking the collagen fibers.

In the generally known methods the water content gel coating is lowered with the assistance of osmosis by leading the strand of foodstuffs through a concentrated salt bath. Thereafter an air drying step is used to further enhance the strength of the sausage casing. After this treatment the mechanical properties of the casing are insufficient to allow for conventional twist linking, clipping, typing, or hanging of the foodstuff, i.e. sausage, strand. With this usual method it is habitual to crimp the co-extruded strand of foodstuff and cut it into independent elements and these elements are placed in a hot air dryer for the treatment of individual elements (for example drying, smoking etc.)

This known method has a number of disadvantages. The first disadvantage is that a sausage is manufactured in which the organoleptical properties are insufficiently equal to sausage which has been manufactured with a natural or artificial casing which are known in the trade. A second disadvantage is that the method limits itself to the manufacturing of smoked/cooked sausage and fresh sausage. Dried semi-dried and fresh sausage cannot be economically manufactured. A third disadvantage is that usual smoke-and/or cooking installations cannot be used economically in the further processing. With the known method the meat mix is provided with a collagen coverage while with the traditional methods a casing is used which strongly and flexibly encloses the meat mix entirely during the further processing and shapes the sausage.

Further, a similar method is known from the international patent application WO93/12660 whereby it is intended to avoid the aforementioned problems. This method equally includes the steps of coextruding a mainly equal layer of collagen gel around an extruded edible product and the chemical coagulation of the extruded collagen gel while using a chemical coagulation means, though without the step of drying with hot air in order to achieve a coagulated collagen casing around the edible product, which has sufficient strength to allow mechanical separation into individual foodstuff elements which are connected to each other, especially sausages.

Also, with this known method the aforementioned problems and disadvantages have not been resolved adequately. It has been demonstrated that a thus manufactured casing of collagen gel of co-extruded edible foodstuffs, i.e., sausages, has insufficient strength to allow traditional further processing. Furthermore a consequence of low casing strength is that the shape of the sausage rope is not consistent, principally in certain types of further processing. For instance, when strands of edible foodstuffs which are thus manufactured are being hung the partly "fluid" meat mix flows down which gives the edible foodstuffs a cone shape. Such a shape for sausages is undesirable. Additionally, due to the mechanical loading of the gel casing which is not strong enough rupture can occur. Also, the production speed with this known method is disadvantageously influenced by the still insufficient strength and shape rigidity of the casing. An additional disadvantage is that, due to the lengthy stay in the coagulation bath, the salt content in the casing and in the meat mix, is high. This results in unwanted organoleptical and physical changes of the sausage mix, such as in taste, consistency and firmness of the meat mix.

While this known method nevertheless has some attributes in spite of the above disadvantages, it is not capable of replicating the mechanical, physical and organoleptical properties of existing conventional sausages.

The principal purpose of the invention is a method for manufacturing of food strands with an edible casing in which the previous disadvantages of the known methods do not occur.

It is also the purpose of this invention to provide a novel linking method, advantageously used on continuous manufactured edible foodstuff strands, but can also be used in other sausage processing methods.

With the method according to the invention only the outside surface of the gel casing is being dried after the usual steps of co-extrusion and treatment with the coagulation means, by which moisture is being removed from the extruded gel, and the cross-linking of the collagen fibers is being facilitated, and thus the mechanical strength of the gel casing is increased. The strength which is achieved in this way is sufficient to provide a casing which can be further treated in the usual way. In the case of edible foodstuffs, i.e., sausage, manufacturing, it is possible to prepare in this way fresh smoked or cooked edible foodstuffs of which the properties are equal to those of known edible foodstuffs which have been manufactured in a natural or edible or non edible artificial casing.

The moisture content of the casing of the edible foodstuff after leaving the coagulation bath is approximately 90% or higher. With the drying of the outside surface of the gel casing the moisture content is lowered to a value whereby the casing will reach the desired mechanical strength. By adjusting the moisture content the mechanical strength of the casing can be adjusted to the desired value. Maximum strength of the casing can usually be achieved by lowering the moisture content to the range of 40–75%, for example, 50%.

The temperature of the meat under the casing will preferably stay low during the surface drying of certain types of sausages (for example below approximately 35 degrees C.) so that principally no coagulation of the food proteins such as meat proteins will occur. With other types of edible foodstuffs, the coagulation of the meat proteins can be desirable.

The drying of the surface of the formed casing can be effected with appropriate means. A device which is preferably being used for the drying is a surface dryer, whereby the casing is directly being irradiated by a radiation source whereby the moisture which is being removed out of the casing is being conducted away with the help of conditioned airflow. This conditioned airflow also prevents the sausage casing and the underlying meat mixture of being heated to unwanted temperatures. In this way a homogeneous drying of the casing is achieved down to for example 50% moisture in a short time of for example 30 seconds. An appropriate means of radiation is for example a source which emits middle wave infra red radiation.

Advantageously the method is provided with a separation step to separate the strand of foodstuffs into individual elements which are connected with each other. This can be effected in the usual way by crimping, twisting, clipping or tying before or after the surface drying of the strand of foodstuff which is provided with a casing.

In those places, where usually a twist, clip or such like is being used it is advantageous to isolate the individual elements with a chemical clip. In this application a chemical clip consists of a closure made up out of an edible or non-edible non-toxic material. Appropriate materials are for example, polyamide, polyethylene, cellulose and proteins and other natural or artificial polymers. Such a clip can for example occur by titrating, injecting, or spraying an appropriate quantity of an adequate material or materials so that in a short time by hardening a mechanical strong ring is being formed which holds the crimp during the following treatment steps of the strand of foodstuffs.

The invention also concerns a device for the manufacturing of strands of foodstuffs with a casing which is formed out of a protein, especially of sausage strands, which includes means for the co-extrusion of a principally homogeneous coating of gel around an edible product, as well as a coagulation bath for the chemical treatment of the extruded gel coating and transportation means for the transportation of the extruded strand of edible foodstuffs which is characterized in a surface dryer installed after the coagulation bath with a purpose of drying the gel casing.

Existing equipment and processes have other certain shortcomings. Among these shortcomings are extruders which are complex and cannot be easily adjusted so that the diameter of the food strand can be easily adjusted. Helical conveyors used for the strand are open and invite unwanted lateral movement of the strand during movement through the conveyer trough, and contamination is possible. Driers used are not highly efficient and are sometimes detrimental to the quality of the coating material.

It is therefore an object of this invention to provide a continuous food processing system that will permit an elongated strand of meat or the like to be coated with a coating material which is coagulated, crimped, dried, and conveyed in a rapid and efficient manner.

A further object of this invention is to provide an extruder which has a minimum number of parts and which can produce strands of different diameters.

A still further object of this invention is to provide an infrared drier to facilitate coagulation of the coating material.

A still further object of this invention is to provide an efficient crimping means for the coated strand which will not damage the coated edible strand.

A still further object of this invention is to provide a conveying system for an elongated strand of material that is sanitary and free from contamination.

These and other objects will be apparent to those skilled in the art.

The method for the manufacturing of foodstuff strands with a shaped casing of the aforementioned type according to the invention is characterized in fact that after the treatment with a chemical means moisture is being removed from the extruded gel casing through the drying of the exterior surface of the shaped gel casing.

SUMMARY OF THE INVENTION

A method and apparatus of continuously processing an elongated strand of plastic edible material coated with a coagulated coating. A co-extruder has interchangeable parts to provide strands of varying diameter. The strand is conveyed through a closed tubular conveyor through which a brine fluid is simultaneously passed. The drying of the strand includes an infrared drier. A linker and/or crimper is provided.

DESCRIPTION OF THE PREFERRED EMBODIMENT

Figure 1:
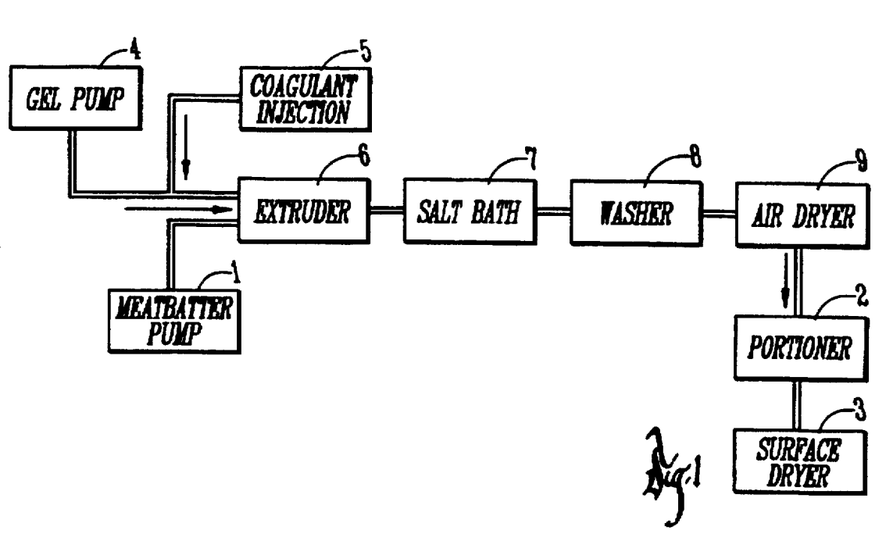
FIG. 1 is a schematic flow diagram of the continuous meat processing system of this invention.
Figures 1B, 1F:
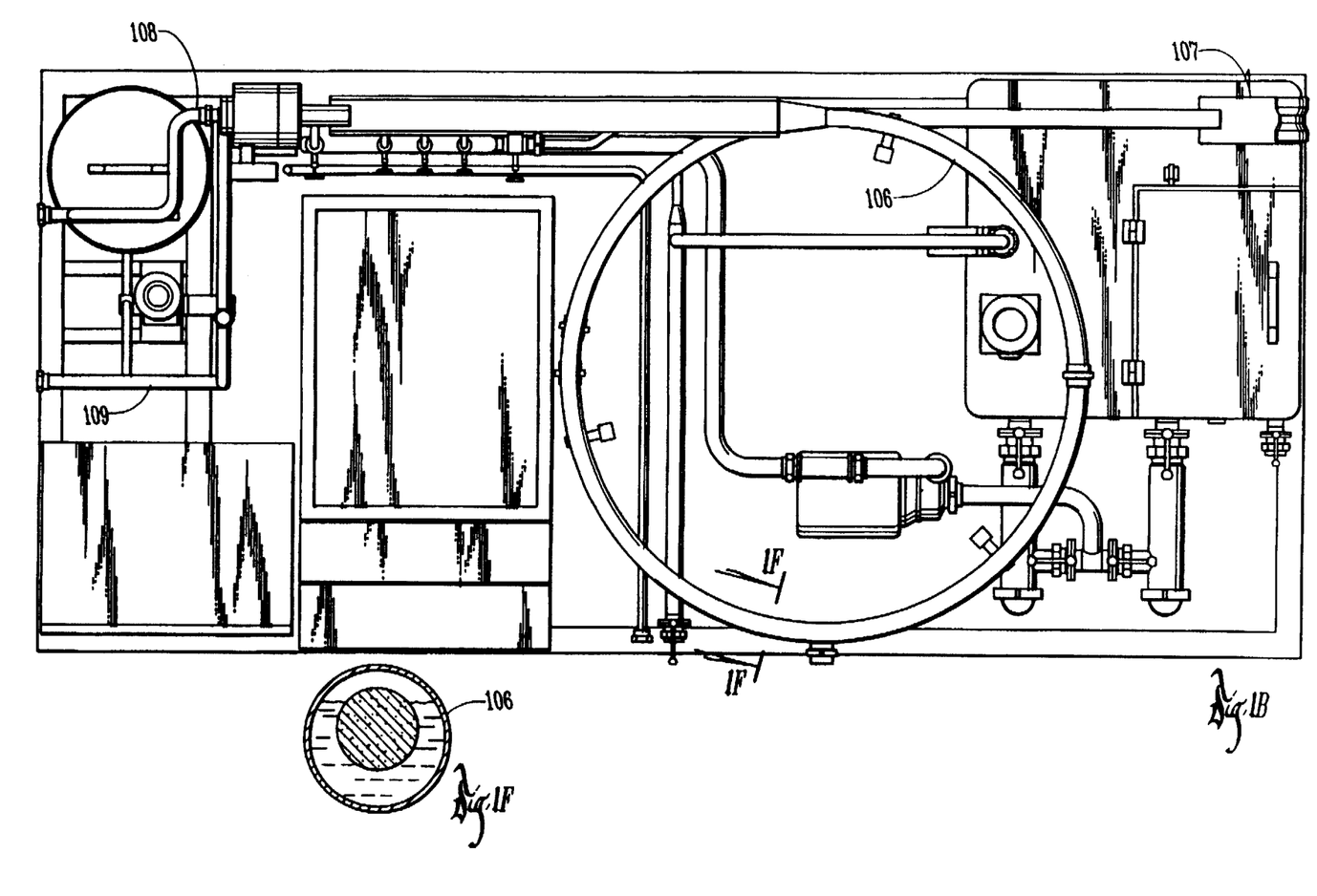
FIG. 1B is a top plan view of the apparatus of this invention.
FIG. 1F is an enlarged scale sectional view taken on line 1F—1F of FIG. 1B.
Figure 1C:
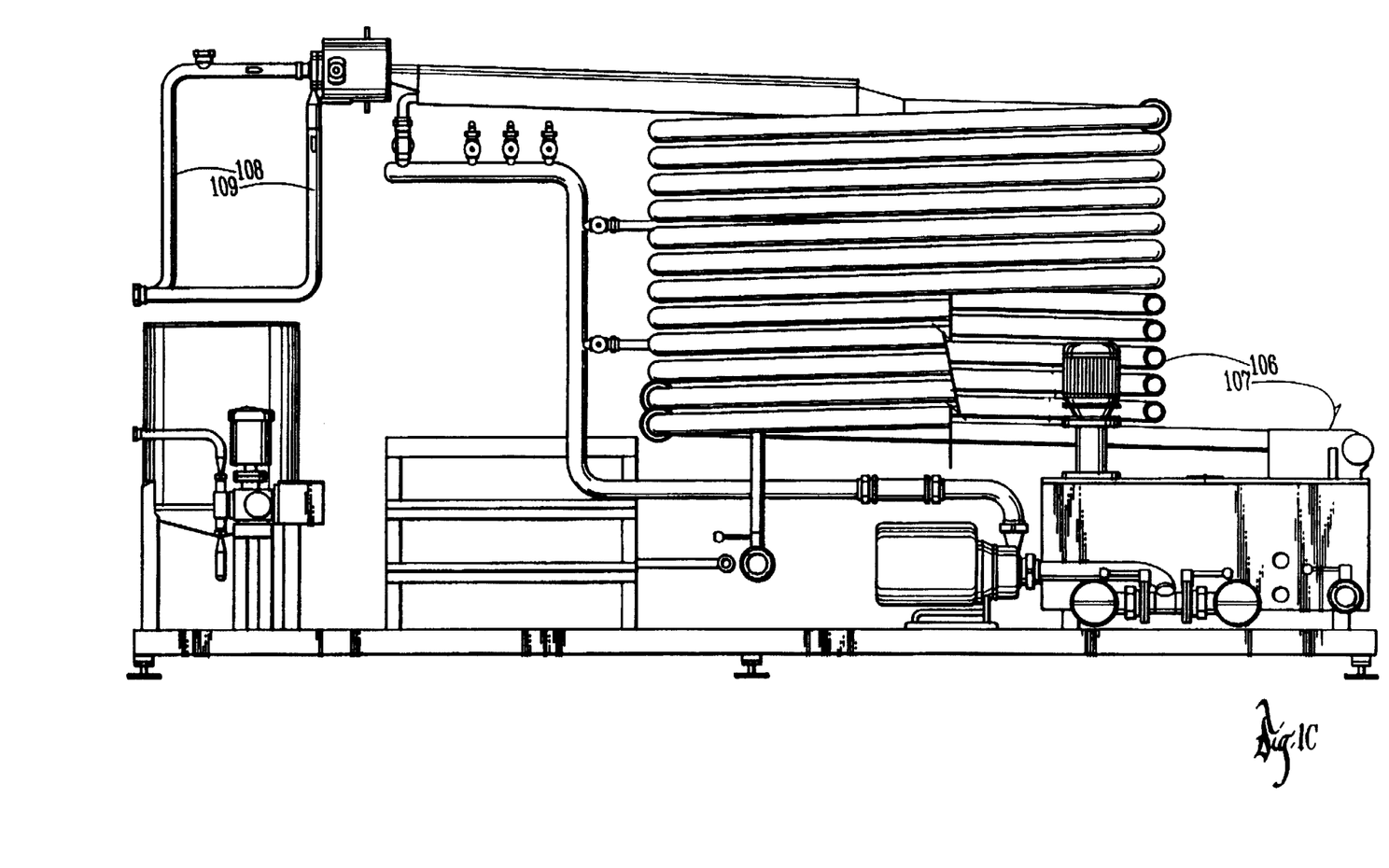
FIG. 1C is a side elevational view as seen from the bottom of FIG. 1B.
Figure 1D:
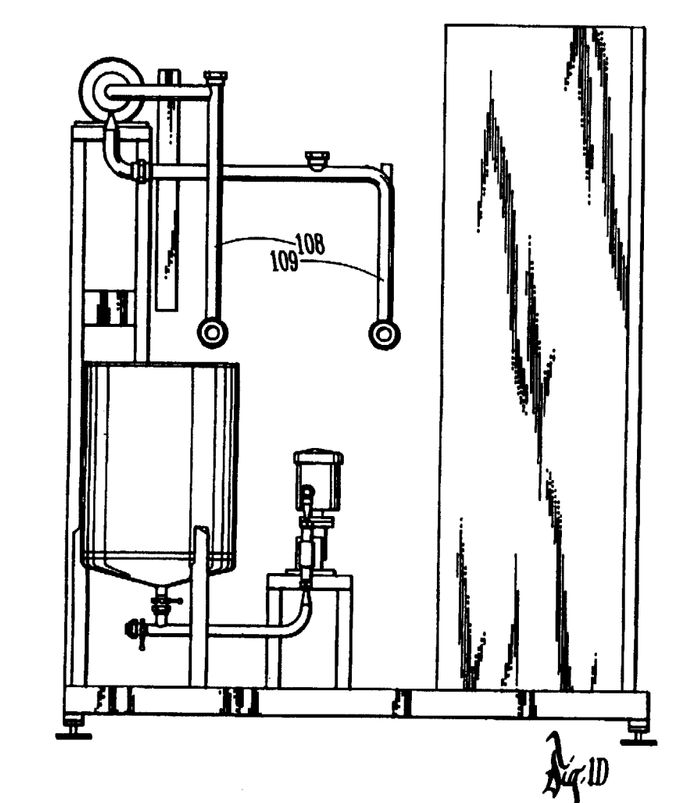
FIG. 1D is an end elevational view as seen from the left hand end of FIG. 1C.
Figure 1E:
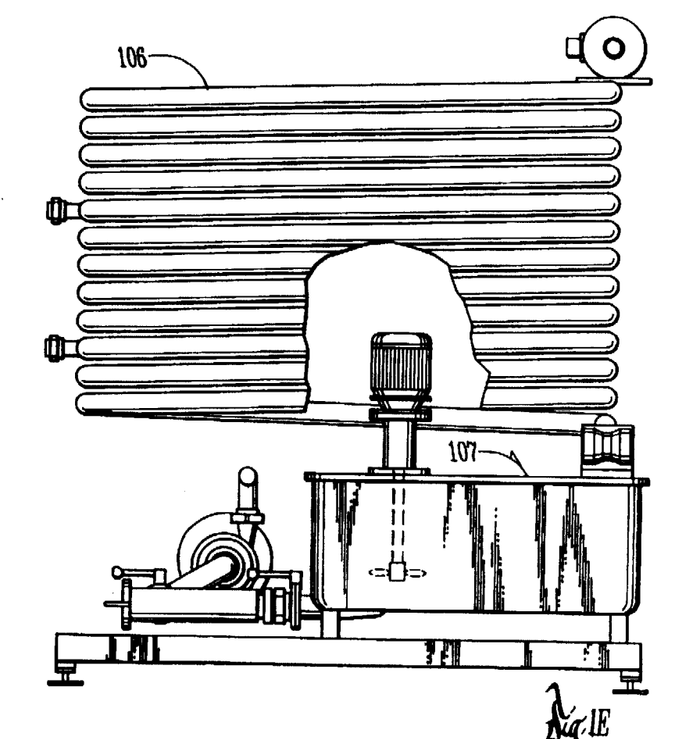
FIG. 1E is an end elevational view as seen from the right hand end of FIG. 1D.

The principal components of the system shown in FIG. 1 are as follows:

Meatbatter pump
Gel pump
Coagulant injection
Extruder
Salt bath
Washer
Air dryer
Portioner
Surface dryer Features of the above components are set forth in the following Table I.

TABLE I

Processing steps of the Continuous Casing Process

| Nr. | Description | Variables | Function | Process-sequence |
|---|---|---|---|---|
| 1 | Meat batter | 1 Comminuted and semi comminuted<br>2 Fat, water, protein conteht<br>3 Other non meat additives<br>4 Temperature 0 to 18 degrees celsius | 1 To form the sausage rope with strong gelling and binding properties while optimizing yield | |
| 2 | Gel | 1 Kind of collagen<br>2 Percentage of collagen in gel<br>3 Percentage of non collagen additives f.i. C.M.C., caramel, etc.<br>4 PH<br>5 Temperature 2 to 18 degrees celsius | 1 To coat the meat rope and to be manipulated in a continuous and edible casing | |
| 3 | Coagulant Injection | 1 Kind and concentration of coagulant<br>2 Percentage of injection v. collagen<br>3 PH<br>4 Percentage of salt | 1 To start crosslinking of the collagen<br>2 To start coagulation of the collagen and proteins of the meatbatter.<br>1 To deswell and dehydrate the collagen layer | See process step 5 |
| 4 | Extruder | 1 Revolution per minute f.i. from 50–300<br>2 Temperature 2 to 18 degrees celsius<br>3 Diameter of the rope from 8 mm onwards | 1 To form a continuous rope of constant diameter and coated with a layer of collagen gel of constant thickness f.i. 0.5 mm<br>2 To orientate the fibres of the collagen gel to facillitate the cross linking. | |
| 5 | Salt bath | 1 Kind and percentage of salt<br>2 Temperature from 5 to 40 degrees C.<br>3 Time from 2 up to 60 seconds | 1 To deswell and dehydrate the collagen layer<br>2 To allow time for coagulation of the collagen and the proteins of the meat | The salt bath may replace the salt injection via the coagulant injection or visa versa |
| 6 | Washing | 1 Water or a less concentrated solution of the salt and/or diluted sugar.<br>2 Temperature from 5–40 degrees C.<br>3 Time from 2 up to 60 sec. | 1 To reduce the percentage of salt in the collagen layer | The washing may be eliminated |
| 7 | Air dryer | 1 Air flow<br>2 Air temperature 10 up to 40 degrees C.<br>3 Time f.i. 0.5 to several minutes. | 1 to remove water from the coating<br>2 To facilitate the strengthening of the casing | In the case the saltbath is eliminated by the coagulant injection, the positioning is directly after the extruder |
| 8 | Portioner & sealer | | | |
| | 1. Pre-crimper | 1 The shape of the meatpusher<br>2 Rope speed, synchronised with the crimper<br>3 Crimper speed | 1 To press the meat batter away from the crimp location | |
| | 2. Crimper | 1 Crimp speed<br>2 Rope speed synchronised with the pre-crimper | 1 To form the definite crimp<br>2 To form the mold to shape the polymer donut | |
| | 3. Sealer | 1 Kind of polymer f.i.:<br>non edible: polyamide, LDDE<br>edible: natural polymers<br>2 Temperature f.i. 120–230 degrees C.<br>3 Time to cool of the polymer | 1 To form a donut to hold the crimp during further processing | For some sausages it is advantaguous to use a heatseal instead of a donut crimp. The heatseal may be made by means of ultrasonic heating |
| 9 | Surface dryer | 1 Radiation intensity | 1 To strengthen the casing by heating the casing above shrinktemperature of the collagen gel, up to 80 degrees C. without coagulating the proteins of the meatbatter, if desired | The surface dryer may replace the air dryer or vice versa |

Figure 2:
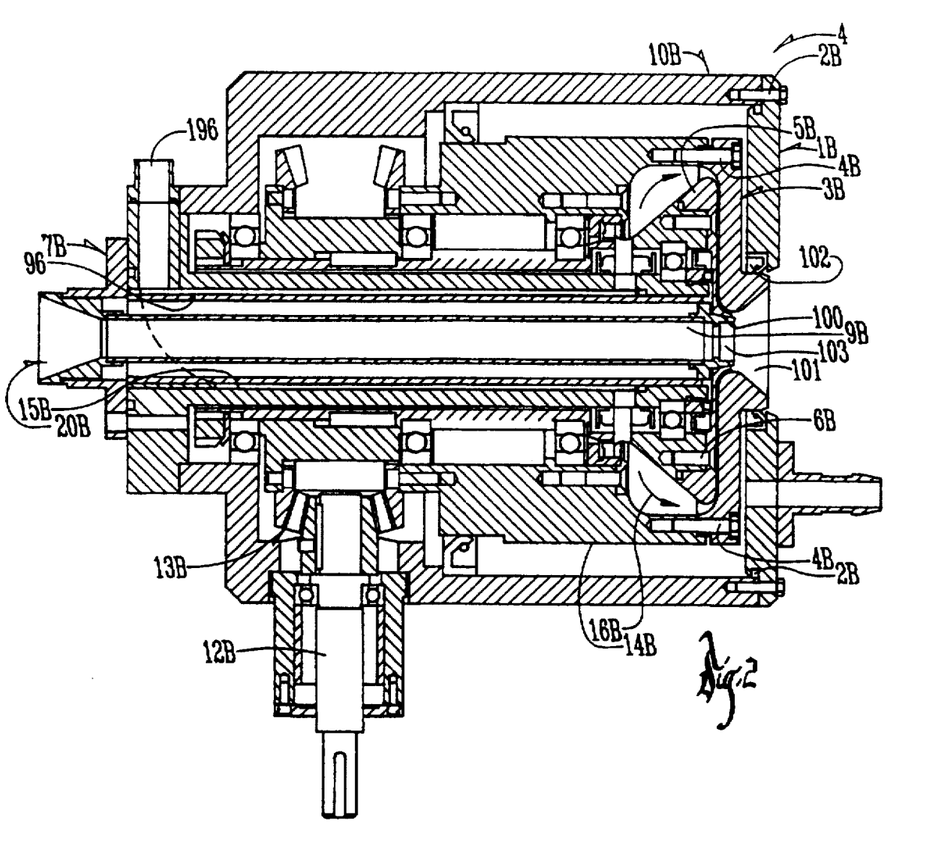
FIG. 2 is a longitudinal sectional view of the extruder of this invention.
Figure 3:
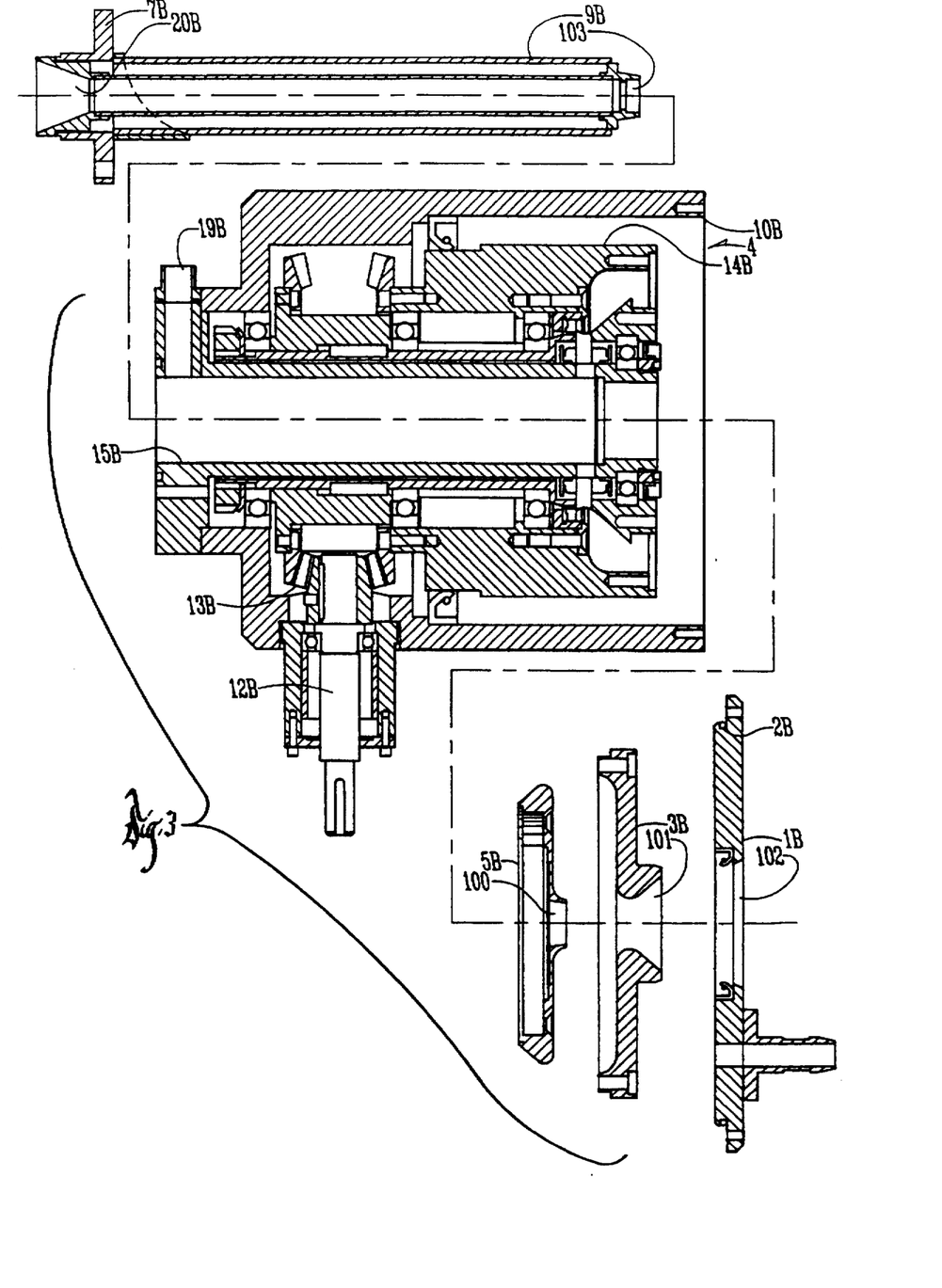
FIG. 3 is an exploded view of the extruder showing interchangeable parts of the extruder to alter the size of the sausage diameter.

The extruder 4 is best shown in FIGS. 2 and 3. The components of the extruder are as follows:

1B. Front plate
2B. Water seal
3B. Outside planer
4B. Bolt
5B. Inner planer
6B. Bolt
7B. Flange
8B. Bolt
9B. Dual extruder tube
10B. Casing
12B. Shaft
13B. Gears
14B. Cradle
15B. Tube
16B. (Arrow)
19B. Port FIG. 3 shows how members 1B, 3B, 5B and 9B can be removed from extruder 4. They can be replaced with similar components which have a different set of discharge orifices 100, 101, 102 and 103 to create a strand or rope 1A (FIG. 1A) of varying diameters.

With reference to FIG. 2, casing 10B is stationary, shaft 12B and gears 13B rotate cradle 14B around tube 15B. Member 3B rotates in a direction opposite to member 5B. This causes the fibers in the coating gel to be oriented as the gel moves in the direction of arrow 16B between these two components to be coated on the meat strand exiting from orifice 103 on coextrusion horn 9B. A gel material mixed with a coagulation agent is introduced into horn 9B through port 19B. Meat emulsion or the like is introduced at 20B.

The collagen dough containing a cellulose ether (gel) and the meat batter are fed to the extruder by a stuffer with a constant volume frequency controlled motor. In the extruder the sausage batter and the collagen gel are extruded simultaneously, so that a continuous rope of sausage is formed with a collagen coating.

The method of extruding comprises feeding under pressure the fluid of collagen fibrils (gel) into a passage way (see arrow 16B) between opposed planer surfaces, rotating said surfaces relative to each other to provide shearing forces to the collagen mass before extrusion. A frequency controlled electro motor provides the rotation of the planer surfaces in opposite senses at 60 to 125 rpm. The two planer surfaces constitute an extrusion die, the gap between them being 0.5 mm.

Figure 4:
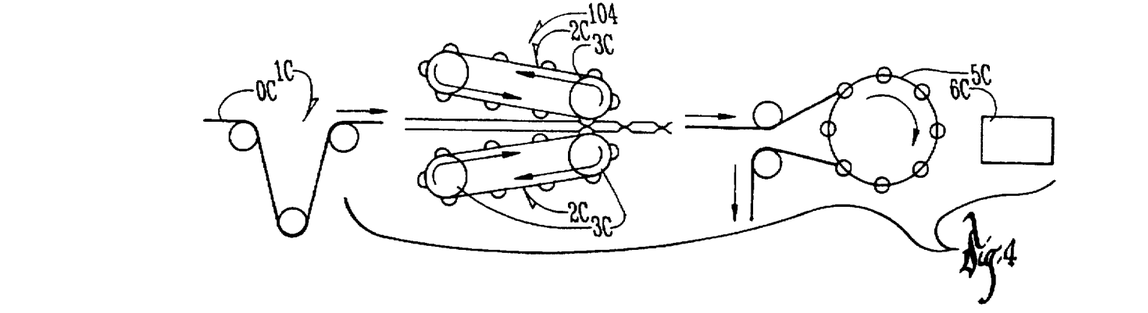
FIG. 4 is a flow diagram of the crimper and sealer of this invention.
Figures 5, 6, 6A:
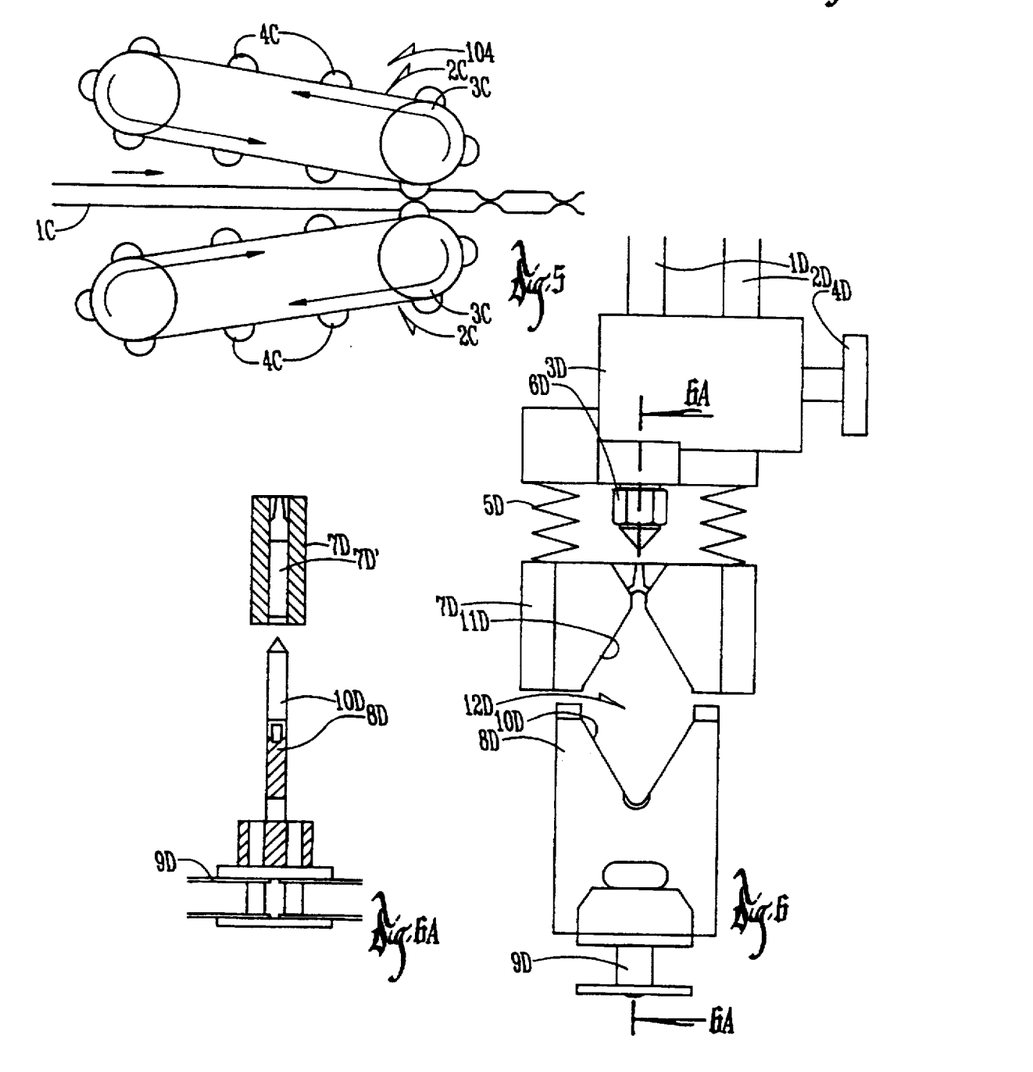
FIG. 5 is a plan view of the pre-crimper of FIG. 4 shown at an enlarged scale.
FIG. 6 is an exploded view of the crimper of FIG. 4.

The lay out crimper and sealer 104 are shown in FIGS. 4 and 5. The component parts and function thereof are shown in the following Table II.

TABLE II

| Crimper and Sealer | | |
|---|---|---|
| Nr. | Description | Function |
| 0C | Conveyor belt | - To convey the sausage rope |
| 1C | Pendulum | - To adjust speed (to control the main drive on the crimp-seal machine). |
| 2C | Pre-crimper | - To force the meat batter away from the location of the crimp. |
| 3C | Turning wheel | - To guide the sausage rope. |
| 4C | Crimp-sealer | - To make the crimp by lowering the crimper into the support plate by means of a cam construction.<br>- To lower the dosing unit and to press the nozzle on to the crimper.<br>- To lift the dosing unit, nozzle and crimper after donut is formed.<br>- To set the length of the individual sausages (number of units on the wheel). |
| 5C | Dosing unit | - To inject an control the amount of polymer into the mould formed by the support plate and the crimper plate. In case of a heat seal, the dosing unit is replaced by a heating element f.i. a ultra sone welder. |
| 6C | Polymer Preparation tank. | - To mix and heat the polymer. |

The crimper 105 (FIG. 6) has the following components and functions:

TABLE III

| Crimper | | |
|---|---|---|
| 1D | Polymer inlet | - Inlet port for polymer |
| 2D | Connection electricity | - Electrical power line connected to power source (not shown). |

TABLE III-continued

| Crimper | | |
|---|---|---|
| 3D | Dosing valve | - To dose and control the amount of polymer per donut (crimp) |
| 4D | Roller | - Guided by a circular cam construction to control the vertical movement. |
| 5D | Spring | - To press the nozzle away from the crimper. |
| 6D | Nozzle | - To extrude polymer |
| 7D | Crimper | - To make the crimp and to form a die for the donut. |
| 8D | Support plate | - To support the sausage rope and form the contra part of the crimper. |
| 9D | Chain | - To transport the sausage rope. |
| 10D | V-shaped notch | - To crimp strand |
| 11D | V-shaped notch | - To crimp strand |
| 12D | Space | |

A frame (not shown) supports chain 9D to which is secured plate or die 8 which has a V-shaped groove 10D therein. The frame also supports elements 1D–7D. Crimper (die) 7 has an inverted V-shaped groove 11D therein and dwells in the same plane as die 8. Space 12D permits a strand of product to pass therethrough. Die 7D has notch 7D' therein to receive die 8D. An adhesive or polymer deposits a donut-shaped quantity of adhesive in each crimp in the strand by action of 1D–6D.

Figure 7:
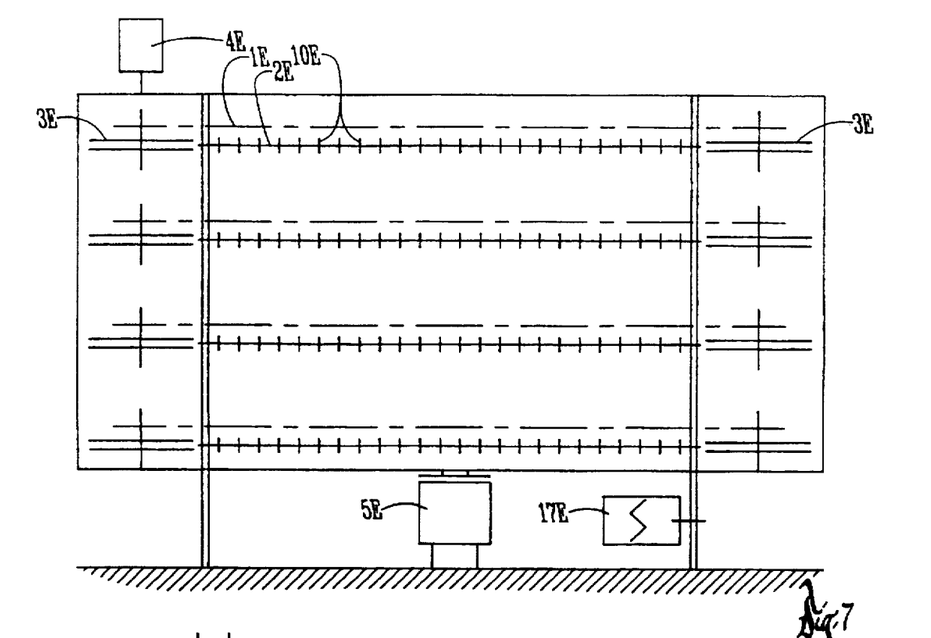
FIG. 7 is a side elevational view of the infrared drier.
Figure 8:
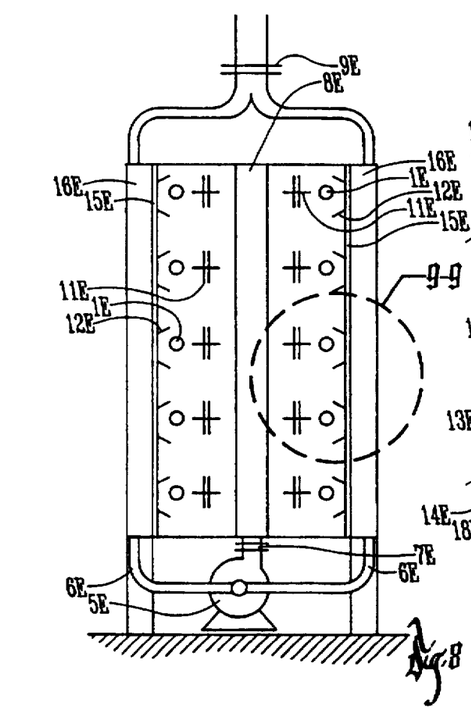
FIG. 8 is an end elevational view of the right hand end of the infrared drier of FIG. 7.
Figure 9:
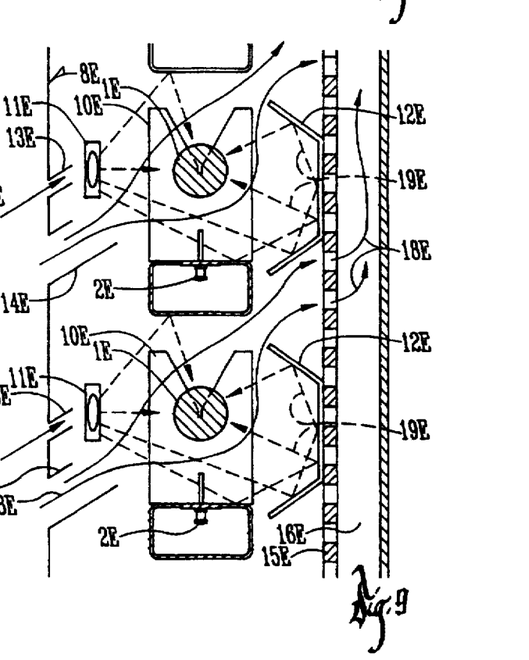
FIG. 9 is an enlarged detail view of FIG. 7 taken on line 9—9 of FIG. 8.

The infrared drier is shown in FIGS. 7, 8 and 9, and has the following components and functions:

TABLE IV

| Infrared Drier | | |
|---|---|---|
| Nr. | Description | Function |
| 1E | Sausage rope | On support plates |
| 2E | Transport chain | - To carry the sausage rope through the dryer |
| 3E | Chain wheel | - To pull the chain |
| 4E | Power unit | - To provide a controlled speed |
| 5E | Ventilator | - To provide airflow for cooling the IR radiators and the surface of the sausage rope, and to transport the vaporized moisture |
| 6E | Air recirculation ducts with regulation valves | - To control air recirculation |
| 7E | Air inlet duct | - To receive ambient air |
| 8E | Air pressure chamber | - To divide the air over the functional openings |
| 9E | Air exhaust ventilator | - To control the amount of circulation air |
| 10E | Support plate | - To help support the sausage rope on transport chain 2E. |
| 11E | IR radiator | - To provide the energy for vaporizing the moisture in the casing. |
| 12E | Reflection mirror | - To reflect the radiation energy for effective use on the sausage rope. |
| 13E | Opening for cooling IR radiator | - To control the temperature. |
| 14E | Opening for cooling sausage rope | - To control the rope temperature and to take away the vaporized moisture. |
| 15E | Restriction plate | - To provide overpressure |

TABLE IV-continued

Infrared Drier

| Nr. | Description | Function |
|---|---|---|
| 16E | Air recirculation chamber | - To receive air exiting the drier in the drying zone. |
| 17E | Frequency control unit | - To regulate the frequency of the IR radiation |
| 18E | Arrows | - To indicate air flow |
| 19E | Arrows | - To indicate infrared radiation. |

The arrows 18E indicates air flow, and the arrows 19E indicate infrared radiation.

FIGS. 1B–1E show the overall layout of the machine for processing the meat strand. Of particular importance is the serpentine (helix or spiral) tube 106 which receives the coated strand 1. The strand is conveyed by the brine through tube 106 to a depositing station 107. The tube is coiled horizontally, and a quantity of brine is flushed through tube 106 while the gel coated strand is floated downwardly therethrough to further assist in the curing and coagulation of the coating material. Because the interior of the tube is entirely closed, as compared to a U-shaped trough with an open top, contamination of the interior of the tube is avoided. (See FIG. 1F.)

Meat dough is introduced into the system at 108, and collagen dough (gel) is introduced into the system at 109.

From the foregoing it is seen that the device and method of this invention will accomplish at least all of the stated objectives.

What is claimed is:

1. A method for making an extruded food product comprising, forming an elongated strand of food product by simultaneously co-extruding said strand and a hardenable coating substance on the outer surface thereof and subjecting said coated strand to a source of infrared energy to harden said coating substance; conveying said coated strand through a serpentine-shaped conveyor, and simultaneously directing a quantity of reactive solution through said conveyor to further cure said coating material; controlling said infrared source so that said coating material is sufficiently dried to a tensile strength sufficient to contain said strand for linking and handling without substantially changing the structure of said strand.

2. The method of claim 1 wherein the temperature of said strand does not exceed 40° C.

3. The method of claim 1 wherein a quantity of air is passed over said coated strand while being subjected to said infrared source to remove vaporized moisture from said coating substance and to minimize the temperature rise in said strand.

4. The method of claim 1 wherein said coated strand is subjected to said source of infrared energy until the tensile strength of said coating substance increases by a factor of 2 or more.

5. The method of claim 1 wherein said coated strand is portioned into a plurality of links, said links have link points surrounded by a hardenable substance to retain their linked condition.

6. The method of claim 1 wherein said coated strand is portioned into a plurality of links, said links have link points surrounded by a edible hardenable substance to retain their linked condition.

* * * * *